United States Patent [19]
Ferguson

[11] Patent Number: 5,839,801
[45] Date of Patent: Nov. 24, 1998

[54] VARIABLE TIRE PRESSURE TRACTION CONTROL ENHANCEMENT

[75] Inventor: Steven C. Ferguson, Orion, Mich.

[73] Assignee: ITT Manufacturing Enterprises, Inc., Wilmington, Del.

[21] Appl. No.: 833,156

[22] Filed: Apr. 4, 1997

[51] Int. Cl.$^6$ ....................................................... B60T 8/88
[52] U.S. Cl. ........................... 303/191; 188/4 R; 141/38; 141/98; 142/416; 340/442; 303/DIG. 7; 303/113.2; 73/146
[58] Field of Search .............................. 303/113.2, 113.3, 303/191, 192, DIG. 7, 133, 139, 122, 122.09, 122.15, 145; 340/440–448; 701/29, 70; 73/146, 146.2, 146.3–146.8; 152/415, 416; 141/38, 1, 98; 301/5.24; 244/103 R; 137/224, 223; 188/4 R, 4 B

[56] References Cited

U.S. PATENT DOCUMENTS

| | | |
|---|---|---|
| 3,768,519 | 10/1973 | Morse . |
| 3,768,599 | 10/1973 | Alexandre et al. .......................... 188/5 |
| 3,871,471 | 3/1975 | Wong ....................................... 152/415 |
| 4,110,732 | 8/1978 | Jarocha et al. .............................. 303/95 |
| 4,313,483 | 2/1982 | Brockman ................................. 137/224 |
| 4,580,519 | 4/1986 | Brewer . |
| 4,763,709 | 8/1988 | Scholer .................................... 152/416 |
| 4,862,938 | 9/1989 | Mittal ........................................ 141/38 |
| 4,883,105 | 11/1989 | Schultz .................................... 152/416 |
| 5,249,609 | 10/1993 | Walker et al. .......................... 73/146.2 |
| 5,307,293 | 4/1994 | Sakai . |
| 5,307,846 | 5/1994 | Heinemann ................................ 141/38 |
| 5,342,119 | 8/1994 | Smith et al. .......................... 303/113.2 |
| 5,516,379 | 5/1996 | Schultz ...................................... 141/38 |
| 5,524,481 | 6/1996 | Claussen et al. ....................... 73/146.3 |
| 5,646,848 | 7/1997 | Walenty et al. . |
| 5,696,681 | 12/1997 | Hrovat et al. ....................... 303/DIG. 7 |
| 5,747,686 | 5/1998 | Nishihara et al. ....................... 340/444 |
| 5,753,809 | 5/1998 | Ogusu et al. ........................... 73/146.2 |

*Primary Examiner*—Douglas C. Butler
*Attorney, Agent, or Firm*—Thomas N. Twomey; J. Gordon Lewis

[57] ABSTRACT

A traction enhancement system includes an electronic controller, first and second pneumatic tire and wheel assemblies, a first wheel brake, a second wheel brake, a source of pressurized air, an air pressure sensor, and a vehicle speed sensor. The first and second pneumatic tire and wheel assemblies each define a pneumatic chamber having pressurized air therein. The first wheel brake operably resists rotation of the first tire and wheel assembly. The second wheel brake likewise operably resists rotation of the second tire and wheel assembly. The source of pressurized air is connected to the tire and wheel assemblies. The air pressure sensor is located and configured to monitor the pressure of the pneumatic chambers, and is electrically connected to the controller. The vehicle speed sensor is electrically connected to the controller as well. The electronic controller includes structure for selectively controlling the pressure within the pneumatic chambers responsive to signals from the vehicle speed sensor and from the air pressure sensor and structure for selectively applying the first and second wheel brakes, and structure for determining the slippage of a given wheel. When one of the first and the second tire and wheel assemblies slips at a vehicle speed less than a predetermined first threshold speed, the pressure in the slipping tire and wheel assembly is decreased to improve traction.

9 Claims, 1 Drawing Sheet

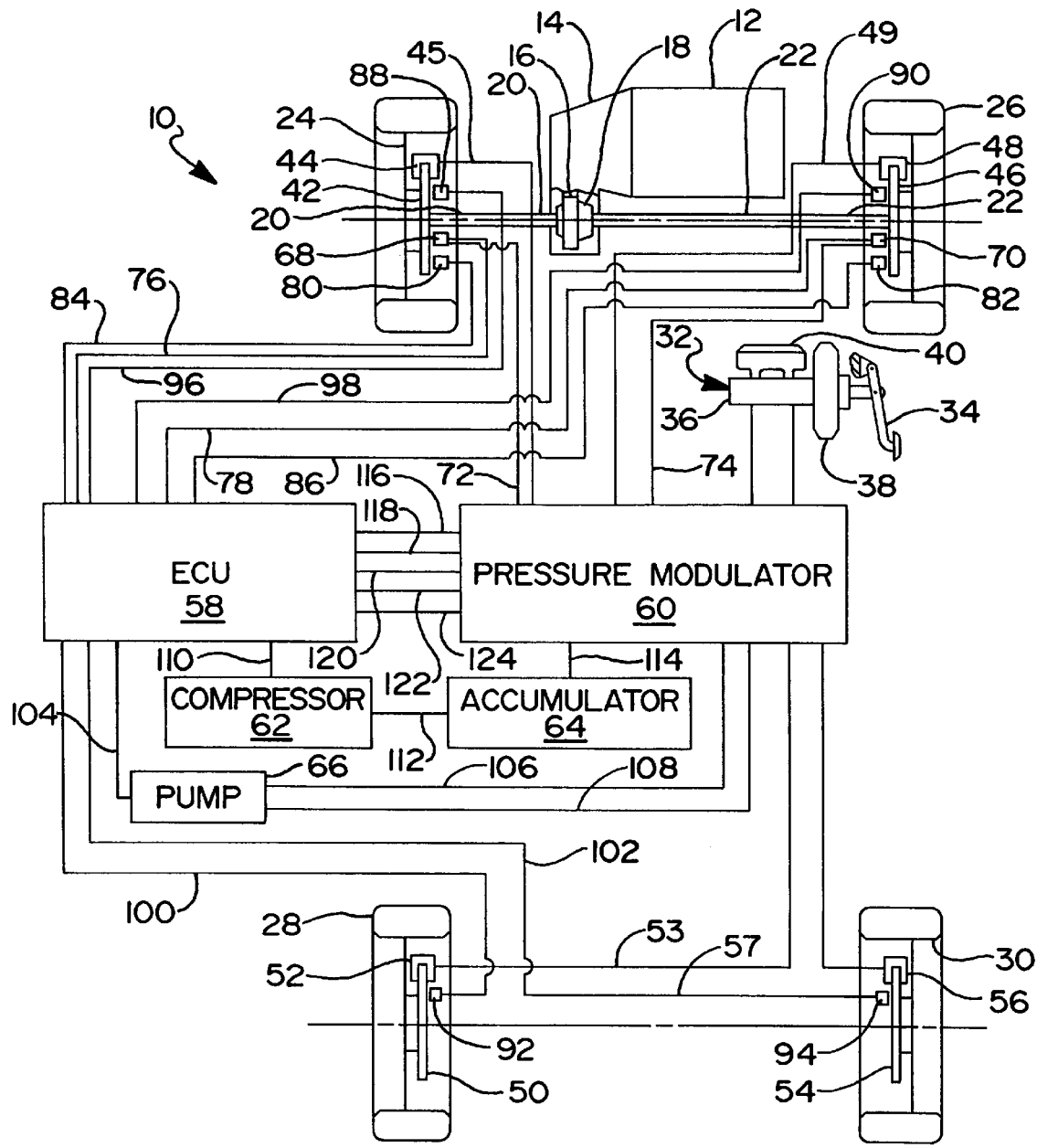
FIG I

VARIABLE TIRE PRESSURE TRACTION CONTROL ENHANCEMENT

FIELD OF THE INVENTION

The present invention relates to traction control systems, and more particularly, to traction control systems employing both brake modulation and tire pressure variation as means for increasing tractive effort.

BACKGROUND OF THE INVENTION

Traction control systems are commonly integrated into anti-lock braking systems. Anti-lock braking systems typically modulate the pressure of hydraulic fluid delivered to a vehicle wheel brake to prevent the vehicle wheel brake from locking up in the braking condition. Traction control systems, when integrated into anti-lock braking systems, actuate the brake of a slipping wheel in an intermittent fashion to minimize the spinning of the slipping wheel, thereby transferring an increased level of torque to the non-slipping wheel. This system is particularly beneficial when the wheel slippage is due to uneven traction conditions, such as icy patches on pavement.

An alternative type of traction control system is provided by a central tire inflation system which controls tire pressure, and decreases tire pressure responsive to a signal indicating wheel slip and increases tire pressure as vehicle speed increases. This system is particularly beneficial when the wheel slipping is attributable to loose traction surface, such as sand or unpacked snow.

It is desired to provide a traction control system enhanced to having superior drivability over both loose traction surfaces and uneven traction surfaces.

SUMMARY OF THE INVENTION

A traction enhancement system includes an electronic controller, first and second pneumatic tire and wheel assemblies, a first wheel brake, a second wheel brake, a source of pressurized air, an air pressure sensor, and a vehicle speed sensor. The first and second pneumatic tire and wheel assemblies each define a pneumatic chamber having pressurized air therein. The first wheel brake operably resists rotation of the first tire and wheel assembly. The second wheel brake likewise operably resists rotation of the second tire and wheel assembly. The source of pressurized air is connected to the tire and wheel assemblies. The air pressure sensor is located and configured to monitor the pressure of the pneumatic chambers, and is electrically connected to the controller. The vehicle speed sensor is electrically connected to the controller as well. The electronic controller includes, as well, means for selectively controlling the pressure within the pneumatic chambers responsive to signals from the vehicle speed sensor and from the air pressure sensor, as well as means for selectively applying the first and second wheel brakes, and means for determining the slippage of a given wheel. When one of the first and the second tire and wheel assemblies slips at a vehicle speed less than a predetermined first threshold speed, the pressure in the slipping tire and wheel assembly is decreased to improve traction.

A traction enhancement system is provided which integrates the advantages of both a conventional traction control system and a tire inflation system.

Other features of the invention will become apparent by reference to the following specification and to the drawings.

BRIEF DESCRIPTION OF THE DRAWINGS

FIG. 1 is a schematic illustration of a traction enhancement system in accord with the present invention.

DETAILED DESCRIPTION

A traction enhancement system 10 is designed to aid in the transmission of torque from engine 12 and transmission 14 to associated drive wheels. Engine 12 and transmission 14 as shown in the illustrated embodiment are configured for transverse orientation with a differential 16 of a drive axle 18 integrated into transmission 14. A left axle shaft 20 and right axle shaft 22 extend from left and right front pneumatic tire and wheel assemblies 24 and 26 respectively for rotatable attachment thereto. A trailing axle includes left rear tire and wheel assembly 28 and right rear tire and wheel assembly 30 which rotates about a common axis. Each of the tire and wheel assemblies defines a pneumatic chamber therein filled with pressurized air, the pressure of which is referred to as the tire pressure. For purposes of brevity, tire and wheel assemblies may be referred to simply as wheels in the specification.

A brake apply mechanism 32 includes a brake pedal 34, a master cylinder 36 with a piston therein displaced by brake pedal 34, a pneumatic power booster 38 which provides a power assist to brake pedal 34, and a reservoir 40 connected to master cylinder 36.

Each of the left front, right front, left rear, and right rear pneumatic tire and wheel assemblies 24, 26, 28 and 30 each have an associated brake, each including respectively a brake rotor 42, 46, 50, and 54, a brake caliper 44, 48, 52, and 56, and a brake line 45, 49, 53, and 57 extending from the associated caliper.

Traction enhancement system 10 includes an electronic control unit or electronic controller or ECU 58, a pressure modulator 60, a compressor 62, an accumulator 64, and a pump 66 which are used to selectively apply braking loads and vary the tire pressure as required to optimize the traction of left and right front tire and wheel assemblies 24 and 26.

Both the left front and right front tire and wheel assemblies 26 and 28 are connected to associated tire inlet valves 68 and 70 respectively. Inlet valves 68 and 70 control the flow of air in and out of wheel and tire assemblies 26 and 28. Each of inlet valves 68 and 70 has an associated inflator line, 72 and 74 respectively, connecting it with pressure modulator 60, and a valve control line, 76 and 78 respectively, connecting valves 68 and 70 with ECU 58. Left front and right front pressure sensors 80 and 82 are also connected with right and left front tire and wheel assemblies 24 and 26, enabling the monitoring of pressure therein. Pressure sensors 80 and 82 are connected with ECU 58 by sensor lines 84 and 86 respectively.

Wheel speed sensors 88, 90, 92, and 94 are located at each of the wheels 24, 26, 28, and 30 respectively, and are connected to ECU 58 by sensor lines 96, 98, 100, and 102 respectively. Pump 66 is connected by pump electrical control line 104 with ECU 58 for selective operation of pump 66. A pump fluid inlet line 106 and a pump fluid return line 108 connect pump 66 with pressure modulator 60.

A compressor electrical control line 110 electrically connects compressor 62 with ECU 58 for selective operation of compressor 62 by ECU 58. A relay (not shown) may be disposed between ECU 58 and compressor 62. A compressor-accumulator pneumatic line 112 connects compressor 62 with accumulator 64. Accumulator 64 is connected with pressure modulator 60 by an accumulator-modulator pneumatic line 114. Electrical connections between ECU 58 and pressure modulator 60 include left front brake release valve control line 116, right front brake release valve control line 118, left rear brake release valve control line 120, right rear brake release valve control line 122, and tire pressure control line 124.

It should be appreciated that the above described structure is exemplary and that alternatives are readily apparent to those skilled in the art. For example, drum brakes may be employed in place of the disk brakes illustrated. Additionally, air brakes, as are used in heavy duty trucks, may be employed instead of hydraulic brakes. Yet alternatively, electrically actuated brakes may be employed in place of conventional fluidly (air or liquid) actuated brakes. Further, the drive train configuration may be different with a longitudinally disposed engine and transmission and rear drive or four wheel drive, instead of the transverse/front wheel drive configuration shown. It should also be appreciated that the pressure modulator 60 includes many of the valves and other fluid flow control devices typically found in anti-lock brake system/traction control system fluid circuits, as well as pressure regulating means for air supplied to inlet valves 68 and 70. Also, although not shown in the figures, it is anticipated that relays would be disposed between electronic control unit 58 and both compressor 62 and pump 66 for the purpose of providing sufficiently high current to those devices 62 and 66 without the need to run relatively high current through ECU 58.

The traction enhancement system 10 operates in the following manner. Under normal operating conditions, not requiring traction control, front tire and wheel assemblies 24 and 26 are maintained at approximately the maximum tire pressure recommended by the tire manufacturer and vehicle manufacturer. Further, during normal accelerating and steady-state driving conditions, neither of the front brakes applies a load resisting wheel rotation unless the brakes are being actively applied by the vehicle operator through brake pedal 34.

In a normal vehicle acceleration, under no slip conditions, engine 12 develops a torque transferred to transmission 14 which multiplies the torque by a transmission ratio and, with a front wheel drive transmission like that shown in FIG. 1, further multiplies the torque by a final drive ratio to provide an output torque to axle shafts 20 and 22 through differential 16. The total torque is divided substantially equally between axle shafts 20 and 22 and is communicated through tire and wheel assemblies 24 and 26 respectively which translate the torque into driving force at the tire patch. However, when at the tire patch of either wheel 24 or 26 or both wheels 26 and 28 engages ice, loose fill such as sand or gravel, loosely packed snow or the like, a sufficient amount of torque desired to provide an appropriate rate of acceleration will not be developed, particularly when differential 16 is an open differential. With an open differential, the torque in both axle shafts 20 and 22 remains substantially the same. Therefore, if even just one of wheels 24 and 26 slips and spins faster than the other wheels in an over speed mode due to inadequate traction, drive axle 18 will be unable to transmit sufficient torque to move the vehicle. When signals from sensors 88, 90, 92 and 94 indicate that there is a significant difference in wheel speed between the left and right wheels, or between drive wheels 24 and 26, and non-drive wheels 28 and 30, the ECU 58 will initiate a traction control strategy. Several strategies are programmed into ECU 58, with the strategy chosen being dependent upon certain vehicle operating parameters, including the vehicle speed and the number of wheels that are slipping.

For a vehicle operating at or near a velocity of zero, the velocity being determined by an average of signals from rear wheel speed sensors 92 and 94, serving as vehicle speed sensors, which is calculated by ECU 58, a single slipping wheel is intermittently slowed by its associated brake to develop driving torque at the other of the front wheels. Which of the wheels 24 and 26 are slipping is determined by comparing their speed signal to the signal corresponding to vehicle velocity.

For example, if left wheel 24 is slipping, ECU 58 activates pump 66 to supply braking pressure to caliper 44 via pressure modulator 60. Pressure modulator 60 pulses or attenuates the brake application so that torque will be transferred through axle shaft 22 to wheel 26 will be sufficient to move the vehicle, with the pulsing action allowing wheel 24 to intermittently rotate in the drive direction. If rear sensors 92 and 94 indicate that there is still no movement of the vehicle, which occurs when both wheels are in a slip condition, the air pressure in tire and wheel assemblies 24 and 26 is progressively decreased to a predetermined minimum, if necessary, to increase traction sufficiently to provide the desired vehicle movement without damaging the tires. Pressure in tire and wheels assemblies 24 and 26 is decreased by ECU 58 which opens inlet valves 68 and 70 to allow pressure to be bled back to pressure modulator 60 which exhausts the unwanted air to atmosphere. The low tire pressure is maintained until the vehicle achieves speeds above a predetermined limit, at which point the ECU 58 runs compressor 62 which charges accumulator 64, from which air at a pressure regulated by pressure modulator 60 is supplied to inlet valves 68 and 70. Valves 68 and 70 are opened under the control of ECU 58 to enable repressurization of tire and wheel assemblies 24 and 26.

One alternative strategy to the one described above would be to reduce the tire pressure as first step in attempting to achieve adequate traction, and employ intermittent brake engagement only if the tire deflation approach is unsuccessful.

Yet another strategy is to deflate only the slipping tire in an attempt to improve traction before deflating the second tire, thereby saving the energy needed to reinflate both tires if deflation of only one is sufficient to achieve traction. If deflation of one tire does not provide the desired traction, the brake is applied to the slipping side in an intermittent fashion to aid tractive effort, with the second tire being deflated only if the brake application is unsuccessful in obtaining the desired traction.

It should be appreciated that vehicles having alternative drive line configurations may employ appropriately different strategies. For instance, four wheel drive vehicles would include the rear tire and wheel assemblies 28 and 30 in the tire inflation control system as well as front tire and wheel assemblies 24 and 26. This additional hardware would enable the use of alternative strategies which deflate all four of the tire and wheel assemblies, as well as selectively applying torque to the tire and wheel assemblies through the brakes.

The above described traction enhancement strategies are directed to vehicles starting from a dead stop or vehicles operating below a predetermined vehicle speed or velocity. For vehicles operating over the speed at which it would be considered safe to operate tires in the deflated condition, traction control must be achieved exclusively through the use of intermittent brake engagements.

While a preferred embodiment of the invention has been disclosed, it should be apparent that the invention is not limited to the disclosed embodiment but rather that it is intended to include all embodiments which would be apparent to one skilled in the art and which come within the spirit and scope of the appended claims.

I claim:

1. A traction enhancement system for a vehicle comprising:

an electronic controller;

a drive axle having first and second axle shafts;

first and second pneumatic tire and wheel assemblies with each defining a pneumatic chamber having pressurized air therein and rotatably fixed to the first and second axle shafts respectively;

a first rotary speed sensor located at one of the first tire and wheel assembly and a part that rotates substantially in unison with the first tire and wheel assembly and the first sensor being electrically connected to the electronic controller wherein the first rotary speed sensor provides an electrical signal corresponding to the rotary speed of the first tire and wheel assembly;

a second rotary speed sensor located at one of the second tire and wheel assembly and a part that rotates substantially in unison with the second tire and wheel assembly and the second sensor being electrically connected to the electronic controller wherein the second rotary speed sensor provides an electrical signal corresponding to the rotary speed of the second tire and wheel assembly;

a first wheel brake operably resisting rotation of the first tire and wheel assembly;

a second wheel brake operably resisting rotation of the second tire and wheel assembly;

a source of pressurized air connected to the pneumatic chambers;

an air pressure sensor located and configured to monitor the pressure of air within the pneumatic chamber of one of the tire and wheel assemblies and the air pressure sensor being electrically connected to the controller;

a vehicle speed sensor electrically connected to the controller; and the electronic controller including means for selectively controlling the pressure within the pneumatic chambers responsive to signals from the rotary speed sensors and from the air pressure sensor, means for selectively applying the first and second wheel brakes, and means for determining slippage of the tire and wheel assemblies using the electrical signals from the rotary speed sensors, wherein one of the first and second tire and wheel assemblies slips at a vehicle speed less than a predetermined first threshold speed, the pressure in the slipping tire and wheel assembly is decreased to improve traction and the wheel brake associated with the slipping wheel and tire assembly is intermittently applied to develop drive torque at the other of the first and second wheels.

2. A traction enhancement system as claimed in claim 1 wherein a pressure modulator includes a plurality of electrically responsive valves which are disposed between the source of pressurized air and the pneumatic chambers with the valves being electrically connected to the electronic controller.

3. A traction enhancement system as claimed in claim 1 wherein a valve is disposed between the source of pressurized air and the pneumatic chambers and is electrically connected to the electronic controller.

4. A traction enhancement system as claimed in claim 2 wherein a first valve is disposed between the pressure modulator and the pneumatic chambers and is electrically connected to the electronic controller.

5. A traction enhancement system as claimed in claim 4 wherein the first valve and the pressure sensor are disposed proximate to the one of the pneumatic chambers and another pressure sensor which is electrically connected to the electronic controller and a second valve which is electrically connected to the electronic controller and is disposed between the pressure modulator and the other pneumatic chamber with both the other pressure sensor and the second valve being disposed proximate to the other pneumatic chamber.

6. A traction enhancement system for a vehicle comprising:

an electronic controller;

first and second pneumatic tire and wheel assemblies defining a first pneumatic chamber and a second pneumatic chamber respectively with each of the chambers having pressurized air therein;

first and second rotary speed sensors electrically connected to the electronic controller and located in a position facilitating the sensors providing signals of the rotative speed of the first and second tire and wheel assemblies respectively;

a selectively actuable source of pressurized air connected to the pneumatic chambers;

an air pressure sensor located and configured to monitor a pressure of air within one of the pneumatic chambers and being electrically connected to the electronic controller;

first and second electronically responsive inflation control valves disposed between the source of pressurized air and the first and second pneumatic chambers respectively and the first and second valves being electronically connected to the electronic controller;

first and second wheel brake assemblies operably resisting the rotation of the first and second tire and wheel assemblies respectively being selectively actuable;

a vehicle speed sensor electrically connected to the electronic controller;

the electronic controller including means for selectively actuating the first and second wheel brakes, and means for identifying a tire and wheel assembly slipping in an over speed mode and means for selectively applying the brake associated with the tire and wheel assembly identified as slipping, means for decreasing the pressure in the pneumatic chamber of the slipping tire and wheel assembly employing the associated inflation control valve and the source of pressurized air wherein when one of the first and second tire and wheel assemblies slips the pressure in the pneumatic chamber of the slipping tire and wheel assembly is decreased and the brake associated with the slipping tire and wheel assembly is selectively applied to increase cumulative tractive effort of the first and second tire and wheel assemblies.

7. A traction enhancement system as claimed in claim 6 wherein the means of the electronic controller for decreasing the pressure in the pneumatic chamber is configured to simultaneously decrease the pressure in the pneumatic chambers of both the first and second tire and wheel assemblies responsive to an indication of slippage of either of the tire and wheel assemblies.

8. A traction enhancement system as claimed in claim 6 wherein the pressure modulator includes a pressure regulator connected air supply lines extending from pressure regulator to the first and second inflation control valves and selectively controlled by the electronic controller.

9. A traction enhancement system as claimed in claim 8 wherein the first and second brakes are fluid actuated responsive to an increase in pressure within the brake lines and the pressure regulator includes a pressure actuation valve electronically connected to the electronic controller and selectively actuated by the electronic controller to provide intermittent application of the brake of the slipping tire and wheel assembly.

* * * * *